Jan. 13, 1959 W. A. SPEAR 2,868,025
KITCHEN POWER UNIT
Filed Nov. 30, 1955 3 Sheets-Sheet 1
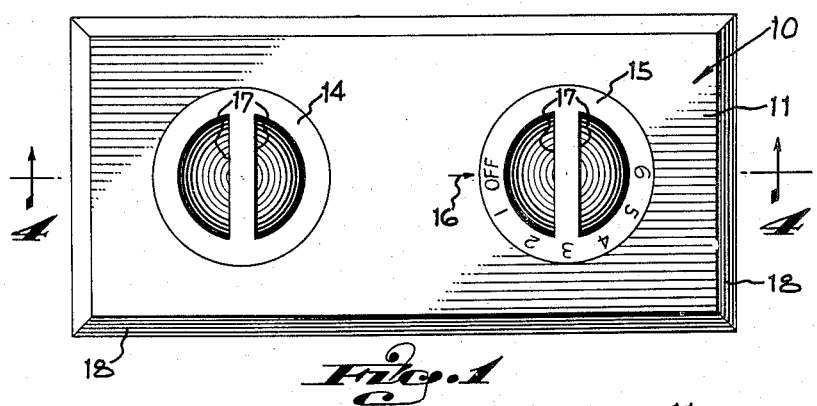
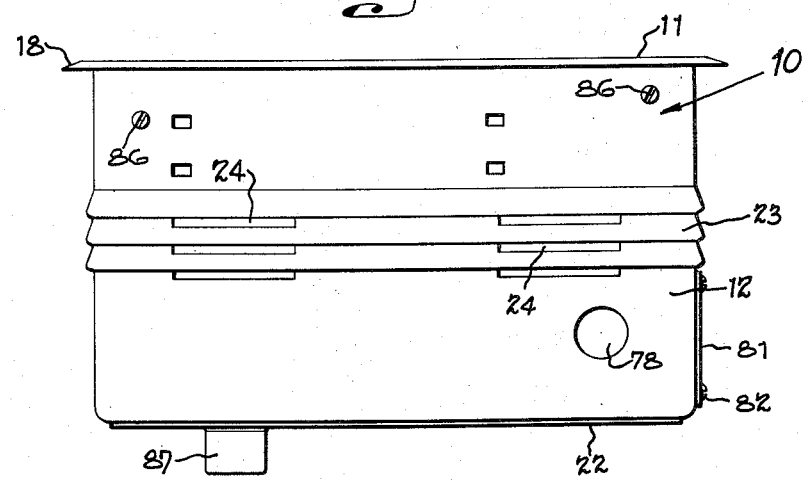
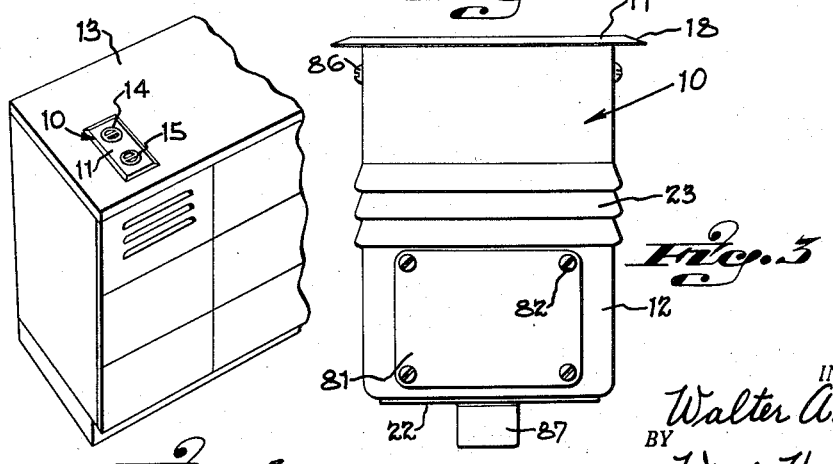
INVENTOR.
Walter A. Spear.
BY Wood, Herron & Evans.
ATTORNEYS.

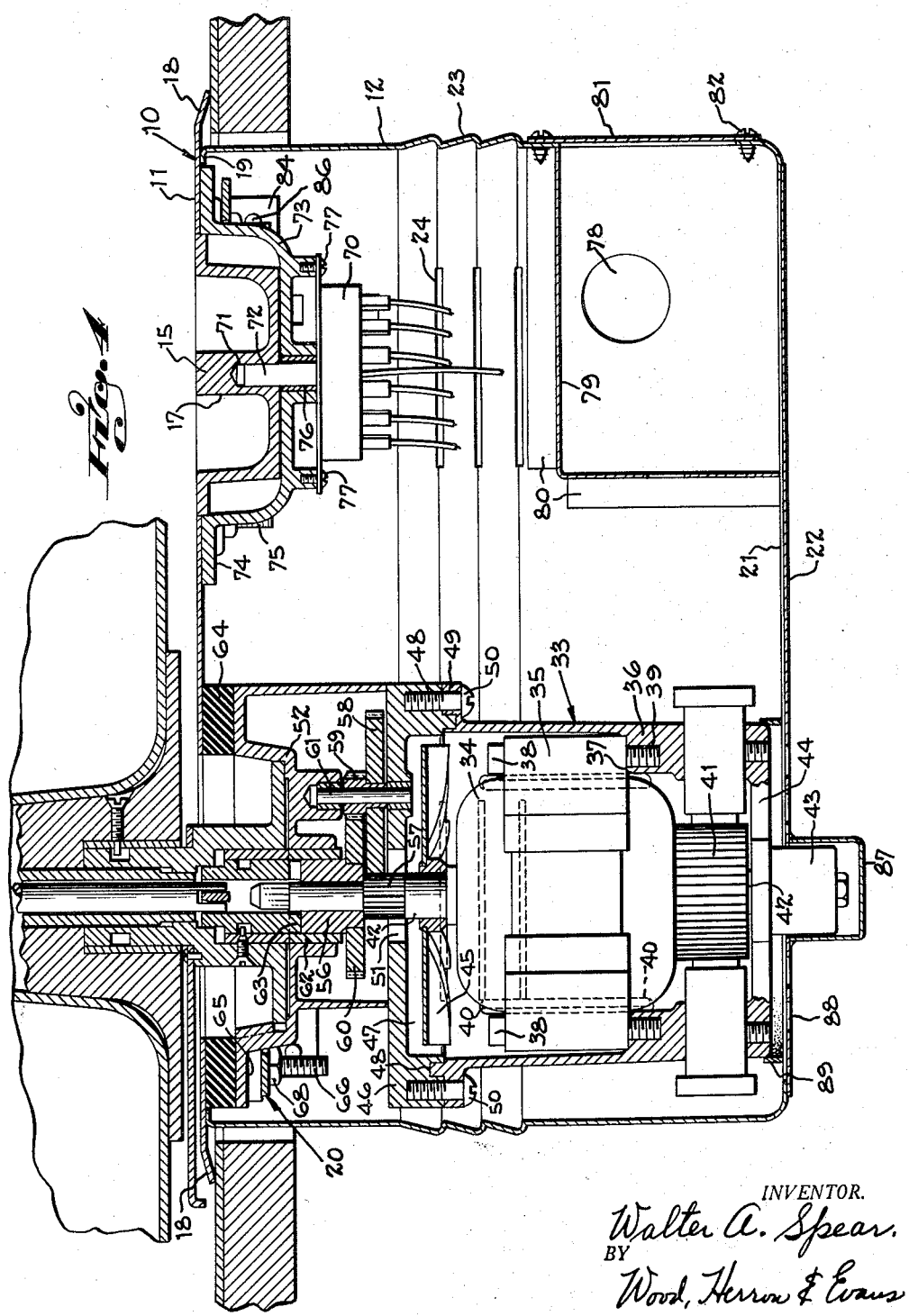

Jan. 13, 1959 W. A. SPEAR 2,868,025
KITCHEN POWER UNIT
Filed Nov. 30, 1955 3 Sheets—Sheet 3
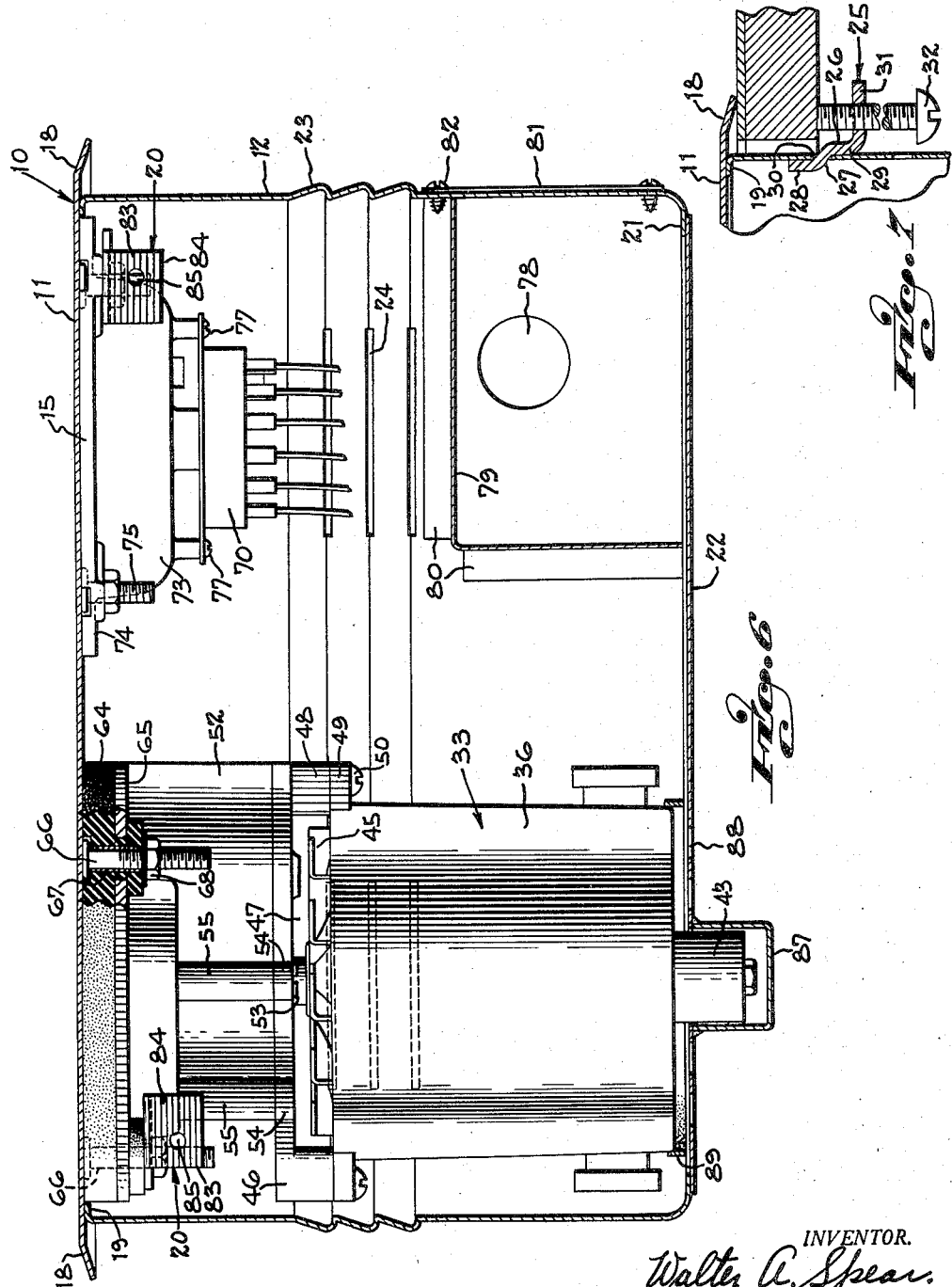
INVENTOR.
Walter A. Spear.
BY
Wood, Herron & Evans.
ATTORNEYS.

United States Patent Office 2,868,025
Patented Jan. 13, 1959

2,868,025
KITCHEN POWER UNIT

Walter A. Spear, Cincinnati, Ohio, assignor to Nu-Tone, Inc., Cincinnati, Ohio, a corporation of New York Application November 30, 1955, Serial No. 550,139

7 Claims. (Cl. 74—16)

This invention relates to power operated kitchen appliances which are used primarily to prepare foods.

The term "appliance" as used herein designates an assembly which may include a stand, a motor which may be mounted in or on the stand, and one or more attachments which are adapted to be driven by the motor. There are a number of such appliances on the market. One such appliance, generally designated a "food mixer," may include a stand, a variable speed motor and a number of attachments or implements designed for use in preparing foods in different ways, such as beating, mixing, juicing etc. The attachments of this type of appliance operate at comparatively slow speeds, seldom exceeding 800 revolutions per minute. Another appliance, designated a "blender," is used primarily to liquify foods and it utilizes a high speed motor which is enclosed within a stand. Usually only one attachment is provided which is a tall receptacle having an impeller in it adapted to be coupled directly to the motor when the receptacle is seated upon the stand. The motor of this appliance may operate at a speed upwards of 10,000 revolutions per minute. There are in addition such specialized appliances as hand beaters, knife sharpeners and others. However, with few exceptions these appliances have been manufactured and sold as complete units, each appliance with its own motor.

The present invention is not concerned with the attachments which are used with such appliances, but is concerned principally with a motor unit which is adapted to drive attachments, including attachments or implements designed to operate at high speeds or at low speeds for preparing foods and for performing other functions in the kitchen. And, it is the primary objective of the invention to provide a motor unit of the type set forth which is adapted to be installed in a kitchen counter in recessed relationship such that its top is flush with the upper surface of the counter. Installed in this way, the motor unit provides a source of power which is readily available for driving any attachment which the housewife may desire to employ.

In the preferred embodiment, the unit comprises a housing which encloses a variable speed motor and a flat cover plate which is on top of the housing. The housing fits down inside of an opening in a kitchen counter so that only the cover plate is visible. The motor is provided with two drive couplers which operate at two different rates of speed, one coupler being for low speed attachments and the other coupler being for high speed attachments. The two couplers are accessible through a removable cap which, when it is in place, is flush with the upper surface of the cover plate. The only other element on the cover plate is a control knob which regulates the speed of the motor, but it too is flush with the cover plate. Hence, when the unit is not being used, it becomes, in effect, a continuation of the counter top so that it does not interfere in any way with the use of the counter for other purposes.

The appliances heretofore available, each being sold with its own motor, have created storage problems in kitchens. This is particularly true of food mixers with their many attachments. The present invention places the equivalent of two of the major parts of such appliances in an out of the way place, since the unit is the equivalent of the motor and of the stand of a conventional appliance. Thus, only the attachments need be stored, and this may be done conveniently in a cabinet drawer of the counter in which the unit is installed.

Other objectives and advantages of the invention will be readily apparent from the following detailed description of the drawings in which:

Figure 1 is a top plan view of a motor unit incorporating the principles of the present invention.

Figure 2 is a side elevational view thereof.

Figure 3 is an end elevational view thereof.

Figure 4 is an enlarged cross sectional view taken on the line 4—4 of Figure 1 showing, also in section, a fragment of an attachment such as a food mixer coupled to the electric motor of the unit.

Figure 5 is a fragmentary perspective view showing the motor unit of this invention installed in place in a kitchen counter top.

Figure 6 is a cross sectional view taken on the same plane as Figure 4 but showing the motor unit and switch in elevation.

Figure 7 is a fragmentary cross sectional view showing a bracket which is used to secure the unit in place.

The numeral 10 is used in the drawings to designate generally a motor unit incorporating the principles of the present invention. The unit includes a top cover plate 11 and a housing 12. When the unit is installed in a kitchen counter, such as the counter designated 13 in Figure 5, the only things showing at the upper surface of the counter are the cover plate 11 and two closure caps or plugs designated respectively 14 and 15. The two caps may be substantially identical as shown. The cap 14 is removable to expose the means for connecting the unit to attachments to be driven. The other cap 15 may also be made so that it can be removed if desired. However, this is not necessary inasmuch as this cap is primarily a means to control the speed of the motor, and for this purpose it has indicia thereon such as the numbers 1 through 6 and the word "off." A small arrow 16 on the cover plate is provided as a reference for the indicia on the cap. The upper surfaces of both caps are flush with the upper surface of plate 11 except for two indentations 17—17 which provide a means of grasping the caps. It will be appreciated that the caps may be hinged to the cover plate, if desired, or that, in the case of cap 14, a slidable lid may be employed to cover the drive connectors when the unit is not being used.

It is preferred that the unit be installed as shown in Figure 5 with the speed control cap 15 to the front and with the cap 14 under which the drive coupler means is located to the rear. In the installation shown, the counter is a conventional type having a top covering a cabinet unit of standard design. These cabinet units may contain drawers or shelves. It is preferred, however, that the upper part of the cabinet in which the motor unit is installed have slots or other openings therein as shown to insure an adequate supply of cooling air for the motor.

More specifically, the top plate 11 of the unit is formed from sheet metal, preferably stainless steel, which is substantially rectangular and which has the four marginal edges thereof turned down or bevelled as at 18. The plate has two circular openings in it to accommodate the two caps 14 and 15. The casing or housing of the unit, which is hidden from view in an installation, also is made from sheet metal formed into a rectangular, box-like structure in which the upper edge thereof is rolled inwardly to provide a flange 19 to which the top cover may be secured by means such as brackets 20—20. These brackets are more fully described below. The lower marginal edge of the housing is also rolled inwardly to provide a flange 21 to which may be welded a bottom cover plate 22. The walls of the housing preferably are rigidified by means of a plurality of louver-shaped undulations 23 which are formed in a wide band extending around the mid-section of the housing. It is preferred that in the louver-shaped area, a plurality of elongated slots 24 be cut through the respective side walls of the housing to permit a flow of air for cooling the motor.

In a counter top installation as shown in Figure 4, a rectangular opening is cut into the top of the counter which is just slightly larger than the outside dimensions of the housing. The marginal edges of the cover plate 11 extend beyond the sides of the housing so that the downwardly turned or bevelled edges 18 of the cover may rest upon top of the counter. The juncture between the edges 18 of the cover plate and the counter top may be sealed by a sealing compound of the type commonly employed to seal the juncture between a sink rim and a counter top.

The complete unit is secured in place by means such as the brackets 25, one of which is shown in detail in Figure 7. In an installation four or more of these brackets may be employed. As shown, each bracket comprises an angle member having a vertical leg 26, which leg has an offset 27 therein to define an upper end 28 and a lower end 29. The offset permits the upper end of the leg 26 to be inserted into the housing through a slot 30 to rest against the inner face of the housing wall immediately above the slot while the lower end of the leg rests against the outside of the housing wall below the slot. The angle member also includes a horizontal leg 31 through which a clamp bolt 32 threads. The brackets are installed after the unit is in place in a counter and the bolts are tightened up against the counter top to lock the unit securely in place.

The electric motor of the unit is indicated generally by the numeral 33 and it comprises a rotor 34 and a stator 35. The housing which immediately surrounds the motor preferably is of cast construction and it includes a substantially cylindrical casing 36 having an internal shoulder 37 therein upon which the stator is seated. Bolts such as those designated 38—38 may be employed to secure the stator in place, the bolts engaging threaded bores 39 which extend downwardly into the casting from shoulder 37. Preferably four or more internal ribs 40 are provided in the casting. These ribs are disposed vertically at spaced points around the inside of the casting and they may be machined in a boring mill to provide a precisely located seat for the stator. Conventional brush assemblies may be seated within appropriate bores adjacent to the bottom of the motor casing, with the brushes thereof disposed at opposite sides of the commutator 41 of the motor. The lower end of the motor shaft, which is designated generally 42 is journalled within a bearing 43 supported from the cylinder wall of casing 36 by means of a spider 44 which is formed as an integral part of the casing. The openings in the spider permit cooling air to enter the casing, the air being pulled upwardly through the casing by means of a fan 45 which is press fitted onto the motor shaft immediately above the rotor. The upper end of the casing receives an end plate 46 and large slots of the type shown at 47 are provided at the juncture of the casing 36 and the end plate 46 to permit the radial exhaust of air from fan 45.

End plate 46 has two broad bosses 48 formed on the rim thereof at diametrically opposed points. These bosses seat upon lugs, such as those designated 49, formed as an integral part of casing 36 and extending radially outwardly from the upper end of the casing. Matching locator pins and holes may be provided at spaced points around the juncture of end plate 46 and casing 36 to properly locate the end plate with respect to the casing. The end plate is secured in place by means of bolts 50 which extend up through the respective lugs 49 and into threaded bores provided in the depending bosses 48 on the end plate. The upper surface of end plate 46 is substantially planar and it has a circular opening 51 in its center through which the shaft 42 of the motor projects. A cast transmission housing 52 is secured to the top of end plate 46 by means such as bolts 53. These bolts extend upwardly through lugs 54, which extend radially at three spaced points from the edge of end plate 46, and into matching ribs 55 which are formed on the wall of housing 52. The latter casting is substantially hollow to enclose the transmission. In addition, the casting has a well formed in the top thereof, which well is adapted to seat appliance attachments. Both the transmission and the details of the manner in which appliance attachments are seated in the well are disclosed in copending application Serial No. 540,226, filed October 13, 1955. The copending application also discloses the way in which the drive of the motor is coupled directly to high speed attachments and through the transmission to low speed attachments. For low speed operations, a clutch element 56 is employed. The drive for high speed attachments is taken directly from the upper end of the shaft 42 of the motor, the upper end being configurated as shown to provide flats for keying the shaft to mating couplers. The device shown attached to the motor unit in Figure 4 is a mixer which is fully disclosed in copending application Serial No. 409,371, filed February 10, 1954.

More specifically, the shaft 42 immediately above the end plate 46 has gear teeth 57 machined into it. A large gear 58 is meshed with the gear teeth 57. A pinion 59 is fixed to gear 58 and this smaller gear drives a second large gear 60 which is keyed directly to the clutch element 56. In the relationship shown, the gear transmission reduces the speed of the drive shaft approximately 18 to 1 so that the drive shaft rotates in this ratio with respect to the clutch element. The gear 58 and pinion 59 are freely rotatably mounted on a shaft 61 which is journalled in bushings at its upper and lower ends respectively in a boss formed as an integral part of the housing 52 and in the end plate 46. The clutch element 56 is rotatably journalled in a bushing 62 press fitted into a boss which is formed as an integral part of housing 52 and which depends therefrom into the hollow interior of the housing. The clutch element is self-lubricating being made of a porous metal such as the metal sold under the tradename "Oilite." Clutch teeth such as those designated 63 are provided in the exposed upper face of the clutch element for engagement with mating couplers of various appliance devices. It will be noted that the teeth of the clutch element 56 are recessed with respect to the bottom of the well for attachments, whereas the upper end of the motor drive shaft 42 is exposed, extending above the bottom of the well. In this way, the two drives may be coupled selectively to either high or low speed appliances without interference from the drive not being employed at the time.

The motor is suspended from the cover plate 11 by means of a vibration dampening mount so that the vibrations which occure during operation of the motor are not transmitted to the plate. Specifically, the vibration dampening mount comprises a thick rubber ring 64 which is substantially rectangular in cross section and which engages the underside of cover plate 11. The upper end of the transmission housing 52 has a radial flange 65 thereon which seats up against the bottom surface of ring 64. The rubber ring has four bolt holes therein and it also has small circular bosses thereon which extend down through apertures in the radial flange, terminating flush with the under surface of the flange. Four bolts 66 are secured to the underside of the cover plate by means such as projection welding in positions to extend downwardly through the holes in the rubber ring and the bosses thereon and through the apertures in the flange 65. In each instance, a thin-walled spacer sleeve 67 surrounds the bolt. A thick rubber washer is engaged around the spacer sleeve below the flange 65. A metal washer, immediately below the rubber washer is engaged on the end of the bolt so that a nut 68 on the lower end of the bolt may be tightened up against the metal washer to bring it into contact with the lower end of the spacer sleeve. The rubber ring and the washers thus insulate the housing from the mount bolts so that the motor is literally suspended in rubber. As will be seen in Figure 4 the inner diameter of the rubber ring 64 conforms to the shape of the well into which attachments are placed, in effect forming a continuation of the well. The vibration dampening mount thus is interposed between the cover plate and the two sources of vibrations, the motor and the attachments, which makes the operation of the unit a quiet one.

The electric motor which is employed is a high speed type capable of operation at approximately 18,000 revolutions per minute this being the upper limit of its speed. The speed is controllable, however, within a range extending down from the top speed by means of a selector switch 70 which is wired electrically into the motor windings, following known techniques, such that six speeds of motor operation are provided, these speeds being indicated on the cap 15. As a result of the speed reducing gear transmission, the six speed settings are applicable both to the clutch element coupler and to the drive shaft coupler. Hence, the attachments, such as those used to mix foods are coupled to the lower speed clutch element. For high speed attachments such as a blender or a knife sharpener, the speeds in the high range are used, being available at the drive shaft coupler.

For the sake of appearance the cap 15 is identical in appearance to the cap 14 (which seats in the attachment well). Cap 14 serves no function other than closing the well. Hence, it may appear in cross section substantially like the cross section showing of cap 15 in Figure 4 except that the underside may be substantially hollow to clear the extended end of the motor drive shaft 42. The cap 15, however, operates switch 70 and for this purpose, it has a flat sided bore 71 in its underside which is engageable with a switch shaft 72 which may be rotated to selectively vary the speed of the motor. As may be seen in Figure 4, the shaft 72 has a flat side thereon which mates with the bore 71 in the cap. The switch 70 is secured to the underside of a cup-like member 73 which is shaped internally generally to conform to the shape of the well. This cup-like member has an upper peripheral flange 74 which is bolted to the underside of cover plate 11 by means such as bolts 75 which are projection welded to the cover in a manner similar to bolts 66. The bolts 75 pass through holes provided in peripheral flange 74 and nuts which are tightened up against the underside of the flange lock the member in place. The member 73 has a central hole 76 in it through which the switch shaft 72 projects and the switch is held in position in spaced relationship to the underside of the member by means such as the metal screws 77—77 which thread into bosses on the underside of the member.

Wiring to the unit may come into the housing 12 through one or more knock-out holes 78 which may be provided in the side walls of the housing at the end thereof opposite to the one in which the motor is located. A wiring box 79 is built into this end of the housing being made of sheet which is bent into a right angle. The sheet metal box may be secured in place inside of the housing by means of end flanges 80 which are spot welded to opposite side walls of the housing. Access into the terminal box may be through a removable cover plate 81 which is secured in place to the housing by metal screws 82—82.

It should be noted that the motor, the gear transmission housing and the well constitute a complete subassembly which may be built and tested prior to the time that it is secured in place onto the cover plate. In the same manner the switch and control knob may be assembled and then secured in place as a unit. Thus, in production, the cover plate may be laid face down upon a supporting surface and these two subassemblies secured in place by engaging them over the respective bolts 66 and 75. The wiring connections then may be made from the motor to the switch, and the unit is ready to receive the outer housing 12.

As a last step in the assembly, the housing is simply slipped over top of the motor and the switch so that the flange 19 which is in the top of the housing rests against the exposed undersurface of the cover or flush plate 11. It may be seen in Figure 6 that flange 19, in the completed unit, is above the rim of the bevelled edge of the cover plate so that it is impossible for water to seep under the bevelled edge from the kitchen counter top and get into the housing. The housing is secured in place by means of a pair of brackets 83—83. These brackets are fastened to the outer pairs of the respective sets of bolts 66 and 75 which secure the motor and the switch in place against the underside of the cover plate. Each bracket comprises a pair of end tabs 84 which are turned downwardly at right angles to a cross reach and which are spaced so as to reside against the inner surfaces of the opposite side walls of the housing. Each tab 84 has a tapped hole 85 therein to receive a metal screw 86 which traverses an appropriate hole in the side wall of the housing. The cross reach of each bracket may be cut out at the side thereof adjacent to the motor or the switch for clearance. The respective bolts 66 and 75 extend through bores in the respective cross reaches and the nuts on the bolts 66 and 76 tighten up against the respective undersurfaces.

It has been found that in a majority of kitchen cabinet constructions the overall distance between the top surface of the counter top and the plane of the upper surface of the bottom of the top drawer is approximately 6¾ inches. Accordingly, the overall height of the housing, from the upper edge of flange 19 to the bottom surface of a cup 87, which is the lowermost part on the housing, preferably is 6¾ inches. Since the flange 19 is recessed with respect to the plane of the beveled edge of the flush plate 11 the bottom of cup 87 will clear the bottom of such a drawer. It is recommended in an installation of this type that the back of the drawer be removed. The cap 87 is provided to enclose the bearing 43 which is at the lower end of the motor shaft 42. The upper rim of the cup is secured by means such as welding to the bottom cover plate 22 of the housing and the housing has a hole within the confines of the cup to permit the bearing 43 to enter the cup.

The bottom cover plate 22 of housing 12 has a plurality of openings 88 therein immediately surrounding cup 87. These openings are directly below the casing 36 of the motor and are provided to permit cooling air to be pulled up into the housing and through the motor casing by fan 45. A fiber ring 89 may be engaged on the lower end of motor casing 36 to enclose a space between the holes 88 and the casing to insure that all of the air pulled through the holes moves up through the casing. Preferably cap 87 extends downwardly beyond the plane of the underside of cover plate 22 approximately ¾ of an inch. This insures that the holes 88 will always be spaced by at least this amount from any structural member, such as the bottom of a drawer, in a cabinet installation, which spacing guarantees an adequate supply of cooling air for the motor.

Having described my invention, I claim:

1. A kitchen appliance motor unit comprising a rectangular flush plate having the outer marginal edges thereof angulated downwardly and outwardly to provide a continuous, rigidifying bevel extending around the four sides thereof, a rectangular housing having the upper marginal edge thereof rigidly secured to the underside of the flush plate inwardly of the bevelled outer edges thereof to further rigidify said flush plate, said unit adapted to be installed in an opening of a kitchen counter top with the bevelled edges of the flush plate resting upon the counter top surrounding said opening to suspend the housing therefrom, means associated with said housing and engageable with said counter top to fasten the unit to said counter top, an electric motor residing within the housing, anti-vibration means suspending the electric motor from the underside of said flush plate independently of said housing, removable means to provide access through the flush plate to the motor, the latter named means adapted to be closed whereby the upper surface of the flush plate is substantially continuous with a kitchen counter top in which the unit is installed.

2. As an article of manufacture, a kitchen power unit adapted to be installed in a counter top to provide a source of power for driving a plurality of attachments, said unit comprising a rigid, substantially flat plate, a housing rigidly secured to and suspended from the underside of said plate to leave marginal areas of the plate overhanging the sides of the housing such that the housing is adapted to be placed down inside of an opening in a counter top with the cover plate resting upon the counter top surrounding the opening, means associated with the housing and engageable with the counter top to fasten the unit to said counter top, an electric motor secured to and suspended from the underside of said plate inside of but independently of said housing, vibration absorbing means interposed between said plate and said motor, an opening in said plate to provide access to said motor for coupling attachments thereto, and means for closing said opening when the power unit is not in use, whereby the plate and the last named means constitute an extension of the useable work area of the counter top.

3. As an article of manufacture, a kitchen power unit adapted to be installed in a counter top to provide a source of power for driving a plurality of attachments, said unit comprising a rigid, substantially flat plate, a housing rigidly secured to and suspended from the underside of said plate to leave marginal areas of the plate overhanging the sides of the housing such that the housing is adapted to be placed down inside of an opening in a counter top with the cover plate resting upon the counter top surrounding the opening, means associated with the unit for engagement with the counter top to fasten the unit to said counter top, an electric motor within said housing having a casing at the upper end thereof configurated to provide a well, vibration absorbing means suspending the casing and motor from the underside of said plate independently of said housing, an opening in said plate to provide access to said well, motor drive coupling means within said well, and a removable cap for closing said opening when the power unit is not in use, whereby the cover plate and the cap constitute an extension of the useable work area of the counter top.

4. As an article of manufacture, a kitchen power unit adapted to be installed in a counter top to provide a source of power for driving a plurality of attachments, said unit comprising a substantially flat, rectangular plate, a box-like, hollow housing, the upper edge of said housing rigidly secured to the underside of said rectangular plate to rigidify the plate and to suspend the housing from the plate, the outer marginal edges of the plate overhanging the sides of the housing, whereby the unit is adapted to be installed in a rectangular opening in a counter top which is slightly larger than the housing with the outer marginal edges of the plate resting upon the upper surface of the counter top surrounding the opening, means associated with the housing and engageable with the counter top to fasten the unit to the counter top, an electric motor arranged with its drive shaft projecting from the upper end thereof, a casing secured to the upper end of the motor and having a well therein which surrounds the projecting drive shaft, anti-vibration means securing the casing to the underside of the plate within the housing such that the casing and motor are suspended from the plate independently of the housing, an opening in said plate to provide access into the well and to the drive shaft therein, and means to close said opening when the power unit is not in use, whereby the plate and the last named means constitute an extension of the useable work area of the counter top.

5. A kitchen power unit as set forth in claim 2 in which the periphery of the plate is turned down to provide a bevel extending continuously around the plate and presenting a continuous outer edge to the upper surface of a counter in which the unit is installed, said edge being below the underside of the plate itself to block the seepage of liquids from the counter top into the housing.

6. A kitchen power unit as set forth in claim 3 in which the housing has a plurality of openings therein directly below the motor, means to direct air entering said openings to said motor, additional openings in said housing to permit the escape of air from said housing, and a projection at the bottom of said housing adjacent to the first mentioned openings to prevent the installation of the unit in a counter having a planar surface therein which is so spaced below the counter top that it would otherwise block the first mentioned openings.

7. A kitchen power unit as set forth in claim 2 in which motor control means are secured to and suspended from the plate independently of the motor and the housing.

References Cited in the file of this patent

UNITED STATES PATENTS

| Number | Name | Date |
|---|---|---|
| 1,183,953 | Chilcott | May 23, 1916 |
| 1,293,622 | Roberts | Feb. 4, 1919 |
| 1,393,167 | Saal | Oct. 11, 1921 |
| 1,480,553 | Hoff | Jan. 15, 1924 |
| 1,555,150 | Oswald | Sept. 29, 1925 |
| 1,604,242 | Smedberg | Oct. 26, 1926 |
| 1,756,123 | Jarrett et al. | Apr. 29, 1930 |
| 1,756,917 | Tenney | Apr. 29, 1930 |
| 1,812,651 | Gullberg | June 30, 1931 |
| 1,823,314 | Brewer | Sept. 15, 1931 |
| 1,860,885 | Bilde | May 31, 1932 |
| 1,942,689 | Erbach | Jan. 9, 1934 |
| 2,014,444 | Miller | Sept. 17, 1935 |
| 2,136,247 | Kroenlein | Nov. 8, 1938 |
| 2,180,859 | Borchers | Nov. 21, 1939 |
| 2,181,278 | Lantz | Nov. 28, 1939 |
| 2,730,905 | Pence | Jan. 17, 1956 |
| 2,740,907 | Dannenman | Apr. 3, 1956 |

FOREIGN PATENTS

| Number | Country | Date |
|---|---|---|
| 561,169 | Great Britain | May 8, 1944 |
| 253,909 | Switzerland | Nov. 16, 1948 |